(12) United States Patent
Gillespie et al.

(10) Patent No.: US 6,936,232 B2
(45) Date of Patent: Aug. 30, 2005

(54) PROCESS AND APPARATUS FOR REMOVING NO$_X$ FROM ENGINE EXHAUST GASES

(75) Inventors: Robert Frew Gillespie, Abingdon (GB); David Raybone, Stow-on-the-Wold (GB); James Timothy Shawcross, Charlbury (GB)

(73) Assignee: Accentus PLC, Didcot (GB)

( * ) Notice: Subject to any disclaimer, the term of this patent is extended or adjusted under 35 U.S.C. 154(b) by 254 days.

(21) Appl. No.: 10/343,971

(22) PCT Filed: Aug. 15, 2001

(86) PCT No.: PCT/GB01/03636

§ 371 (c)(1),
(2), (4) Date: Feb. 6, 2003

(87) PCT Pub. No.: WO02/16014

PCT Pub. Date: Feb. 28, 2002

(65) Prior Publication Data

US 2003/0180196 A1 Sep. 25, 2003

(30) Foreign Application Priority Data

Aug. 17, 2000 (GB) ............................................. 0020287

(51) Int. Cl.$^7$ ................................................. C01B 21/00
(52) U.S. Cl. ................................ 423/239.2; 423/239.1; 422/169; 422/177
(58) Field of Search .......................... 423/239.2, 239.1; 422/169, 177

(56) References Cited

U.S. PATENT DOCUMENTS

| 6,103,207 A | 8/2000 | Chattha .................... 423/213.2 |
| 2003/0098230 A1 * | 5/2003 | Carlow et al. ............... 204/164 |
| 2003/0170154 A1 * | 9/2003 | Inman et al. .......... 422/186.04 |

FOREIGN PATENT DOCUMENTS

| EP | 0658368 | 6/1995 |
| GB | 2232613 | 12/1990 |
| GB | 2374559 | 10/2002 |
| JP | 9-103649 | * 4/1997 |
| WO | 99/12638 | 3/1999 |
| WO | 99/38603 | 8/1999 |
| WO | 00/71866 | 11/2000 |
| WO | 01/59270 | 8/2001 |
| WO | 01/76733 | 10/2001 |

OTHER PUBLICATIONS

M. Shelef, "Selective Catalytic Reduction of NO$_x$ with N–Free Reductants," American Chemical Society Chemical Reviews, 1995, vol. 95, No. 1, pp 209–225.

Parvulescu et al, "Catalytic removal of NO," Catalysis Today, 1998, vol. 46, pp 233–316.

Martinez–Arias et al, "Study of the lean NO$_x$ reduction with C$_3$H$_6$ in the presence of water over silver/alumina catalysts prepared from inverse microemulsions,"Applied Catalysis B: Environmental, 2000, vol. 28, pp 29–41.

Shimizu et al, "Catalytic performance of Ag–Al$_2$O$_3$ catalyst for the selective catalytic reduction of NO by higher hydrocarbons," Applied Catalysis B: Environmental, 2000, vol. 25, pp 239–247.

Eranen et al, "Influence of Hydrocarbons on the Selective Catalytic Reduction of NO$_x$ over Ag/Al2O3—Laboratory and Engine Tests," International Fall Fuels and Lubricants Meeting and Exposition, Baltimore, Maryland, Oct. 16–19, 2000, SAE Technical Paper Series, 2000–01–2813.

Bethke et al, "Supported Ag Catalysts for the Lean Reduction of NO with C$_3$H$_6$," Journal of Catalysis, 1997, vol. 172, pp 93–102.

Hoard et al, "Comparison of Plasma–Catalyst and Lean NO$_x$ Catalyst for Diesel NO$_x$ Reduction," International Fall Fuels and Lubricants Meeting and Exposition, Baltimore, Maryland, Oct. 16–19, 2000, SAE Technical Paper Series, 2000–01–2895.

Tonkyn et al, "Lean NOx Reduction in Two Stages: Non–thermal Plasma Followed by Heterogeneous Catalysis," SAE, 2000–01–2896, no date.

Lampert, "An Assessment of the Plasma Assisted Catalytic Reactor (PACR) Approach to Lean NOx Abatement: The Relative Reducibility of NO and NO$_2$ using #2 Diesel fuel as the Reductant," SAE 2000–01–2962, no date.

Fisher et al, "Mechanistic Studies of the Catalytic Chemistry of NOx in Laboratory Plasma–Catalyst Reactors," SAE 2000–01–2965, no date.

Thomas et al, "Non Thermal Plasma Aftertreatment of Particulates—Theoretical Limits and Impact on Reactor Design," International Spring Fuels & Lubricants Meeting & Exposition, Paris, France, Jun. 19–22, 2000, SAE Technical Paper Series, 2000–01–1926.

Miyadera, "Alumina–supported silver catalysts for the selective reduction of nitric oxide with propene and oxygen–containing organic compounds," Applied Catalysis B: Environmental, 1993, vol. 2, pp 199–205.

Miyadera et al, "Alumina–supported Catalysts for the Selective Reduction of Nitric Oxide by Propene," The Chemical Society of Japan, Chemistry Letters, 1993, pp. 1483–1486.

Masuda et al, "Silver–promoted catalyst for removal of nitrogen oxides from emission of diesel engines," Applied Catalysis B: Environmental, 1996, vol. 8, pp 33–40.

Nakatsuji et al, "Catalytic reduction system of NO$_x$ in exhaust gases from diesel engines with secondary fuel injection," Applied Catalysis B: Environmental, 1998, vol. 17, pp 333–345.

(Continued)

*Primary Examiner*—Christina Johnson
(74) *Attorney, Agent, or Firm*—William H. Holt

(57) ABSTRACT

A method and apparatus for removing nitrogen oxides from internal combustion engine exhaust emissions consisting of the operations of contacting the exhaust emissions with a non-thermal plasma (1) and a silver doped alumina catalyst (2) and then an indium-doped zeolite catalyst (3).

26 Claims, 7 Drawing Sheets

OTHER PUBLICATIONS

Keshavaraja et al, "Selective catalytic reduction of NO with methane over Ag–alumina catalysts," Applied Catalysis B: Environmental, 2000, vol. 27, pp L1–L9.

Meunier et al, "Mechanistic Aspects of the Selective Reduction of NO by Propene over Alumina and Silver–Alumina Catalysts," Journal of Catalysis, 1999, vol. 187, pp 493–505.

Masters et al, "Selective reduction of nitric oxide by methanol and dimethyl ether over promoted alumina catalysts in excess oxygen," Applied Catalysis B: Environmental, 1999, vol. 23, pp 235–246.

Iwamoto et al, "Oxidation of NO to $NO_2$ on a Pt–MFI zeolite and subsequent reduction of $NO_x$ by $C_2H_4$ on an In–MFI zeolite: a novel de–$NO_x$ strategy in excess oxygen," Chemical Communications, 1997, pp 37–38.

WPI Abstract AN 1997–28 371 & JP 9103649, pp. 1 & 2, no date.

* cited by examiner

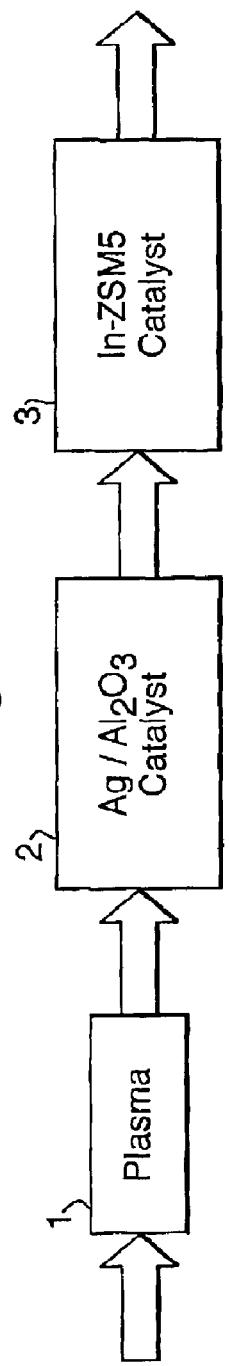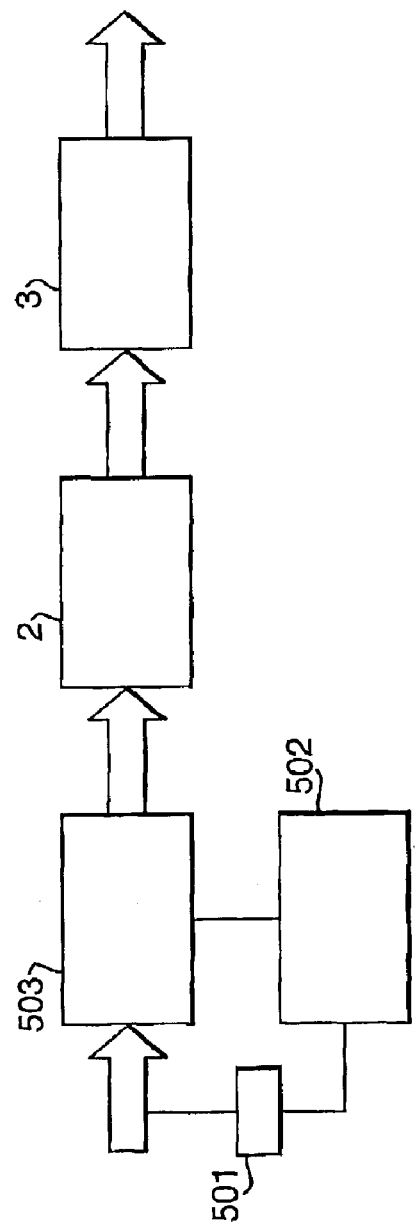

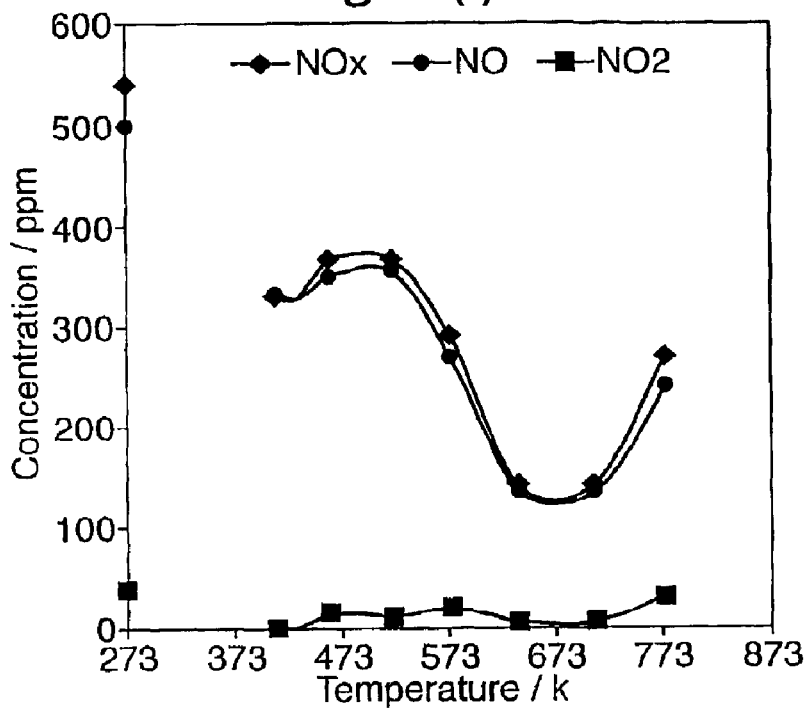
Fig.2 (i).
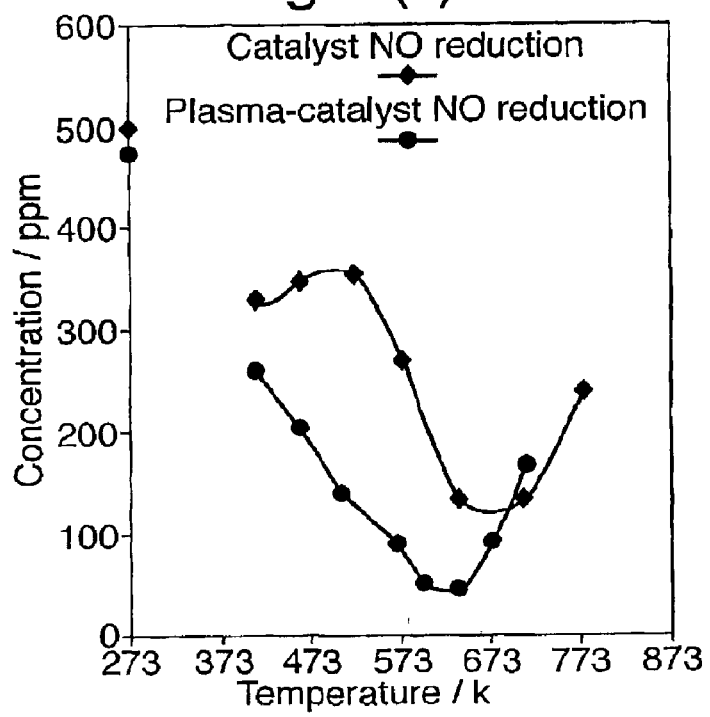
Fig.2 (ii).

Fig.3.
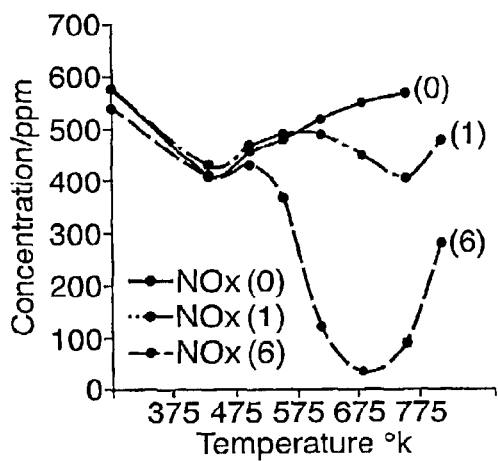
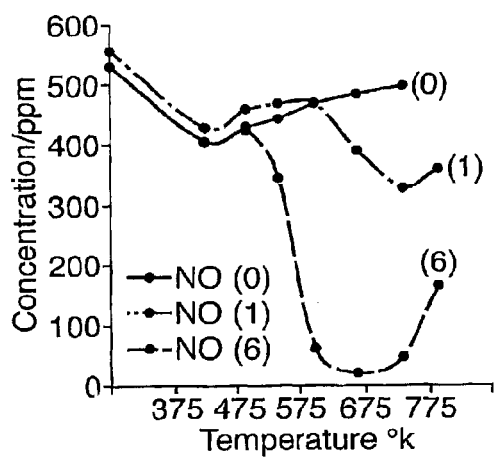
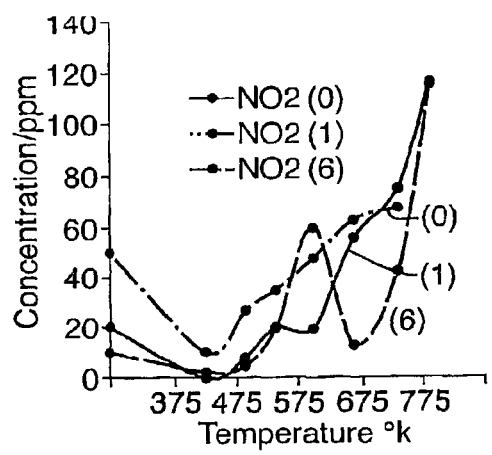

Fig.4.
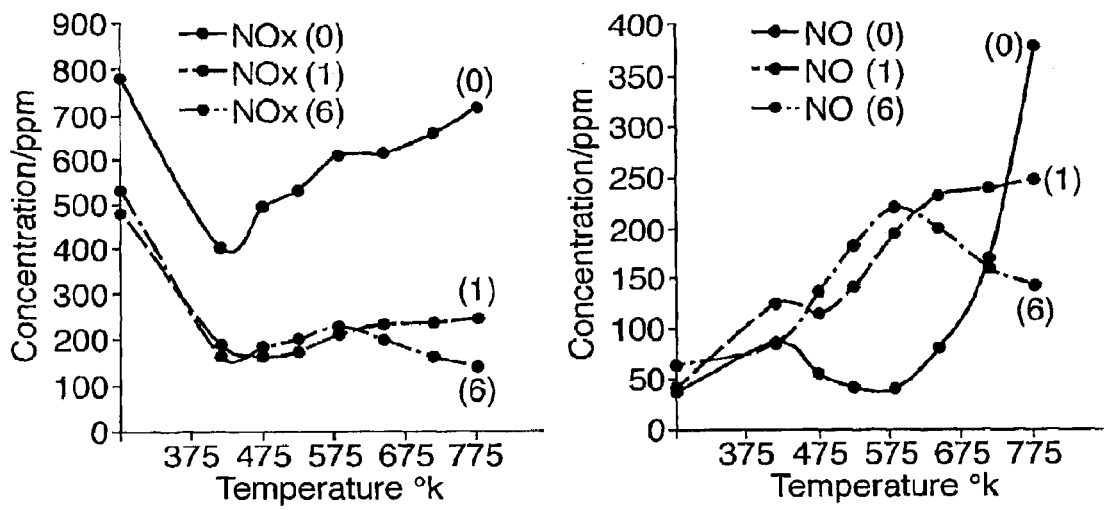
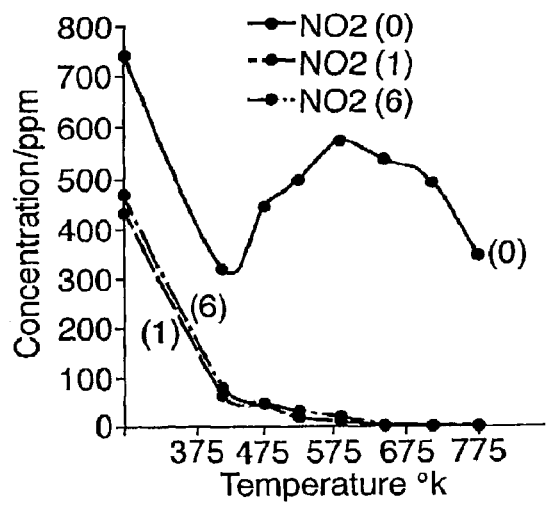

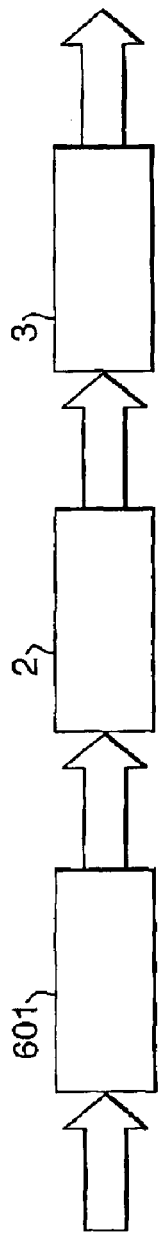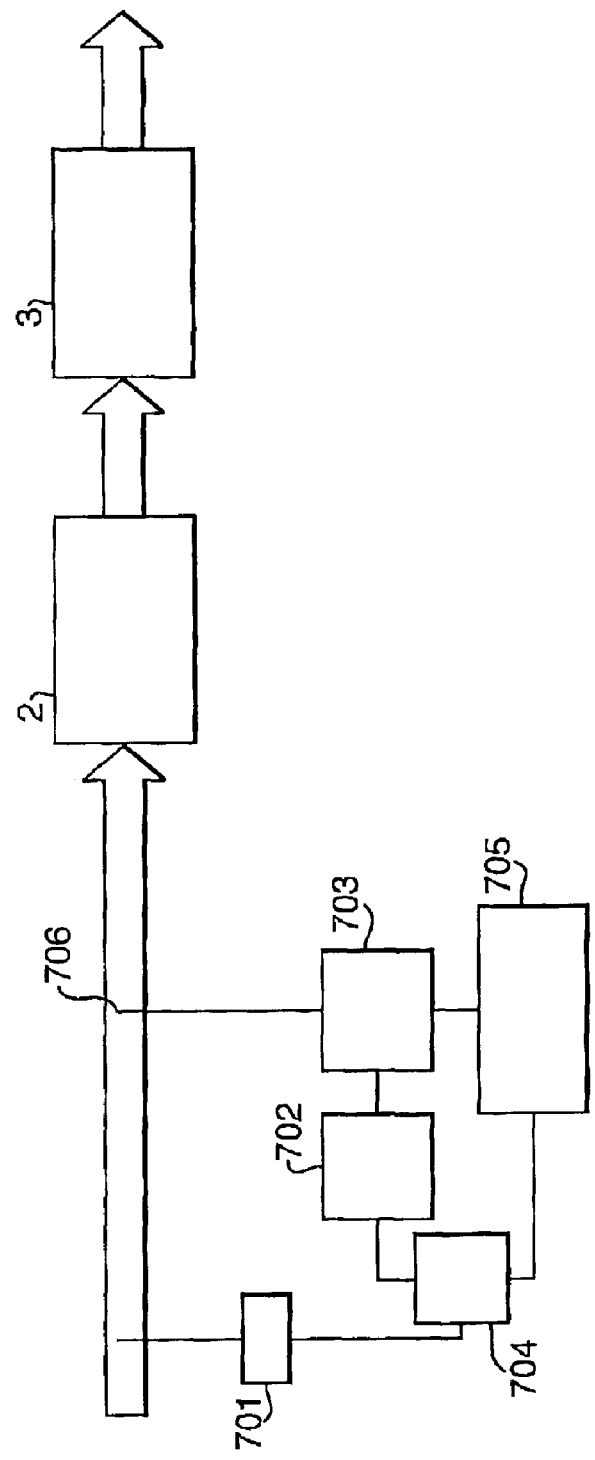

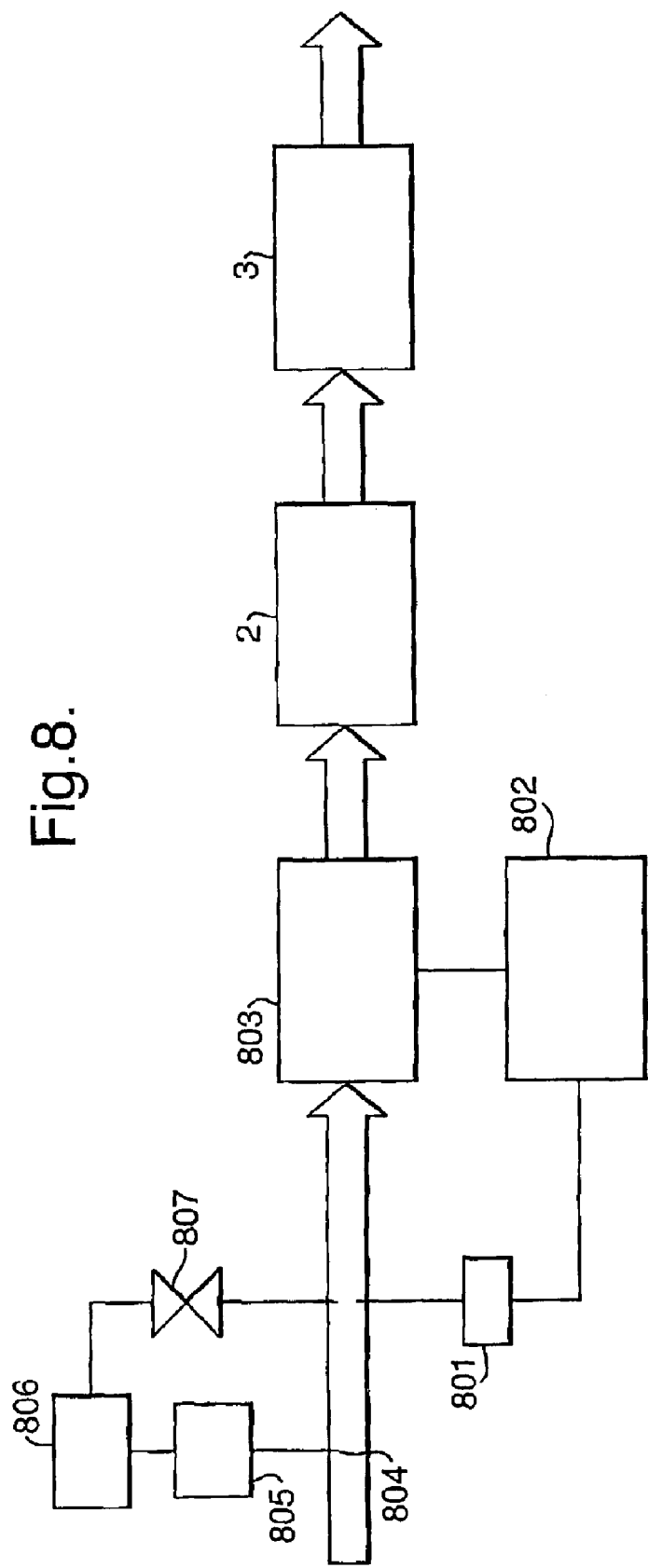

PROCESS AND APPARATUS FOR REMOVING NO$_x$ FROM ENGINE EXHAUST GASES

The present invention relates to the removal of nitrogen oxides from gaseous effluent and more particularly to the treatment of the exhaust gases from internal combustion engines to reduce the emissions of nitrogen oxides. The invention relates, but is not limited to automotive applications such as diesel engines and lean burn gasoline as well as gas turbines and effluent off-gas treatment.

One of the major problems associated with the development and use of internal combustion engines is the noxious exhaust emissions from such engines. Two of the most deleterious materials, particularly in the case of diesel engines, are particulate matter (primarily carbon) and oxides of nitrogen such as nitric-oxide (NO) and nitrogen dioxide (NO$_2$) often collectively referred to as (NO$_x$). Excessive levels of NO$_x$ are also produced by spark-ignition engines operating in what is known as 'lean burn' mode in which the air: fuel ratio is higher than that required for stoichiometric combustion. It is also appreciated that alternative fuels and hybrid type combustion engines, as an example which may burn diesel fuel and/or natural gas, may also pose a similar problem.

Increasingly severe emissions control regulations are forcing internal combustion engine and vehicle manufacturers to find more efficient ways of removing these materials in particular from internal combustion engine exhaust emissions.

One of the ways in which emissions are being reduced is by modifying the combustion process in the engine. Modifications include altering injection timing, engine design, common rail systems and exhaust gas recirculation (EGR) but all have certain limits for practical engine operation. Unfortunately, in practice, it is found that combustion techniques which improve the situation in relation to one of the above components of internal combustion engine exhaust emissions tend to worsen the situation in relation to the other.

There are however numerous aftertreatment techniques being developed to remove NO$_x$ emissions from exhaust gases from internal combustion engine exhaust as well as other waste gas sources. In general, practical NO$_x$ reduction systems for internal combustion engines are reliant on passing the exhaust gases across a catalyst. There are generally two types of catalytic reduction methods used, non-selective and selective catalytic reduction (SCR). This invention is concerned primarily with SCR systems and requires a suitable reductant or reducing agent to be present or added to the exhaust gas. Typical reductants for this purpose are urea or ammonia, but these are not the most practical for mobile vehicle applications. This is because this needs additional space for the reductant tank on the vehicle and a supply infrastructure to allow the reductant to be replenished. SCR catalysts can however perform very effectively using hydrocarbons, normally found in the combustion engine exhaust, as the reductant for a certain range of temperatures. One of the key issues with this approach is whether the exhaust gas has the required concentration of hydrocarbon reductant present to promote the required selective catalytic reactions to reduce NO$_x$ to nitrogen. The concentration of hydrocarbons may be altered, if there is insufficient in the exhaust, by for example, adding a post-injection of fuel into the combustion chamber or by injecting fuel into the exhaust. One recently developed method is to use non-thermal plasma to activate the hydrocarbon, which may be in the form of additional fuel, to promote the catalytic NO$_x$ reduction to nitrogen as disclosed in WO99/12638.

Considerable effort has been dedicated to the development of catalysts for the reduction of NO$_x$ from diesel exhausts. The paper 'Selective Catalytic Reduction of NO$_x$ with N-Free Reductants' by M. Shelef published in Chem. Rev. 1995 pages 209–225 is a comprehensive review in particular of the use of zeolites for the reduction of the NO$_x$ content of internal combustion engine exhaust gases. Other catalysts are mentioned but not dealt with comprehensively. The more recent-review by Parvalescu et al 'Catalytic Removal of NO' published in Catalysis Today, volume 46 (1998) pp 233–316 is a comprehensive document on the range of materials that have been evaluated for the selective catalytic reduction of NO$_x$. The catalysts include zeolites, both proton-exchanged and metal-exchanged zeolites, oxides such as simple oxides, for example Al$_2$O$_3$, V$_2$O$_5$, complex oxides such as perovskites and precious metal supported oxides, in the presence of reducing agents such as hydrocarbons or ammonia. Mixed oxides have also been used in the presence of hydrocarbons for example a mixed manganese/zirconium oxide as-described in U.S. Pat. No. 6,103,207.

Despite extensive worldwide efforts it has been difficult to find an effective catalyst for selective catalytic reduction of NO$_x$ because candidate materials can be deactivated in use for example by water vapour at typical diesel exhaust temperatures. Selectivity of the catalyst is difficult to control as the optimum operating temperature of the catalyst does not always coincide with the exhaust gas temperature. In practice, the catalyst may not be wholly selective to NO$_x$ for example it may oxidise hydrocarbon at the expense of selective catalytic reduction of NO$_x$ to N$_2$. There are also concerns that lean NO$_x$ catalysts which are aimed at reducing NO$_2$ have demonstrated poor selectivity to nitrogen production with the majority of the NO$_2$ being converted to N$_2$O or back-converted to NO.

Silver-based catalysts have been described for the reduction of NO$_x$ in vehicle emissions and these catalysts, particularly silver on alumina, have been prepared by a variety of wet chemical techniques including sol-gel processing. For example impregnation methods including incipient wetness have been described in EP 0 658 368 A (Chemcat), A Martinez-Arias et al in Applied Catalysis B: Environmental, volume 28, pages 29–41 (2000) has used microemulsions, K I Shimuzu et al in Applied Catalysis B: Environmental, volume 25, pages 239–247, (2000) used coprecipitation from non-aqueous solutions, Eranen et al in SAE 2000-01-2813 used impregnation methods and Bethke and Kung in Journal of Catalysis, volume 172, pages 93–102 (1997) used incipient wetness on a sol-gel derived gamma alumina powder. In EP 0 658 368 A (Chemcat) the alumina substrate had a well-defined pore size corresponding to a bulk density greater than 0.60 g cm$^{-3}$ a surface area of 120 m$^2$ g$^{-1}$ and a skeleton density less than 1.80 g cm$^{-3}$ but the silver on alumina catalyst was not used in conjunction with any other catalyst material. Silver-based catalysts can be treated by a hydrothermal treatment before measurement of their catalytic activity as described in PCT/GB 01/01571 and the pending application GB 01 09734.4 filed on 20 Apr. 2001.

In the papers by Miyadera "Alumina-supported silver catalysts for the selective reduction of nitric oxide with propene and oxygen-containing organic compounds" published in Applied Catalysis B: Environmental, volume 2, (1993) pages 199–205, and Miyadera and Yoshida "Alumina-supported silver catalysts for the selective reduction of nitric oxide with propene" published in Chemistry Letters, (1993), page 1483 a 2% Ag-alumina catalyst showed promising hydrothermal stability for $NO_x$ reduction. Added propene and partially oxygenated hydrocarbons, such as 2-propanol, were effective reductants. Masuda et al in the article "Silver promoted catalyst for removal of nitrogen oxides from emissions of diesel engines" in Applied Catalysis B: Environmental, volume 8, (1996), pages 33–40 showed that 3% Ag-mordenite was a promising lean $NO_x$ catalyst compared to Ag-ZSM-5 and Ag-alumina with $CH_3COCH_3$ as reductant. Bethke and Kung in the paper "Supported Ag catalysts for the lean reduction of NO with $C_3H_6$" published in Journal of Catalysis, volume 172, (1997), page 93 showed that the oxidation state of silver affects its catalytic activity for the reduction of $NO_x$. Another silver containing compound, silver aluminate, $AgAl_2O_4$, doped with 0.1 weight % $WO_3$ was shown to be a promising catalyst for the reduction of $NO_x$ by Nakatsuji et al in the paper "Catalytic reduction system of $NO_x$ in exhaust gases from diesel engines with secondary fuel injection" published in Applied Catalysis B: Environmental, volume 17, (1998), pages 333–345. Keshavaraja et al in an article 'Selective catalytic reduction of NO with methane-over Ag-alumina catalysts' published in Applied Catalysis B:Environmental, volume 27, pages L1–L9, 2000 used $CH_4$ for the selective reduction of NO over silver-alumina catalysts at temperatures between 723–923 K with Ag loadings of 1–7 weight percent.

Meunier et al have discussed the role of silver-alumina catalysts on the selective catalytic reduction of NO by propene in an article 'Mechanistic aspects of the selective reduction of NO by propene over γ-alumina and silver-alumina catalysts' published in Journal of Catalysis, volume 187, pages 493–505, 1999. High silver loadings, 10 percent by weight produced $N_2O$ while a low loading, 1–2 percent by weight, was effective for the selective catalytic reduction of NO to $N_2$. Adsorbed organo-nitrogen compounds such as organo-nitrites were intermediate species in the reaction.

Masters and Chadwick showed that oxygenated hydrocarbons, methanol and dimethyl ether can reduce NO to $N_2$ under lean conditions by selective catalytic reduction over γ-alumina. This work, 'Selective reduction of nitric oxide by methanol and dimethyl ether over promoted alumina catalysts in excess oxygen', published in Applied Catalysis B: Environmental, volume 23, pages 235–246, 1999 showed that molybdena ($MoO_3$ additions improved the catalytic activity at temperatures lower than those required in the case of γ-$Al_2O_3$ alone. Surface formyl species were an intermediate product in the reaction.

Combinations of catalysts for reduction of $NO_x$ in which one is indium based have also been described. For example Iwamoto et al in 'Oxidation of NO to $NO_2$ on a Pt-MFI zeolite and subsequent reduction of $NO_x$ by $C_2H_4$ on an In-MFI zeolite: a novel de-$NO_x$ strategy in excess oxygen' published in Chemical Communications, pages 37–38 (1997) have described a combination of a platinum on zeolite catalyst for oxidation of NO to $NO_2$ followed by an indium on zeolite catalyst to reduce $NO_2$ to nitrogen in the presence of $C_2H_4$ in excess oxygen. A combination of a silver-alumina catalyst and an indium-containing ZSM-5 zeolite has been described in JP 9103649 for the reduction of $NO_x$ when methanol was used as the reducing agent. The use of a mixed manganese/zirconium oxide catalyst combined with platinum deposited on gamma alumina that is described in U.S. Pat. No. 6,103,207 is an example of a $NO_x$ reduction catalyst containing more than two active catalyst materials.

There have also been increasing levels of research and development into the combination of a non-thermal plasma and a catalyst to promote the reduction from $NO_x$ from combustion exhaust gas e.g. Hoard et al SAE-2000-01-2895, Tonkyn et al SAE-2000-01-2896, Lampert-SAE-2000-01-2962 and Fisher et al SAE-2000-01-2965.

The non-thermal plasma can help the catalyst overcome some of its inherent temperature and selectivity limitations by creating activated species not normally formed thermally. Two main routes can be identified in the effect of plasma on catalyst $NO_x$ reduction systems in for example automotive exhaust gas aftertreatment. The majority $NO_x$ species in combustion exhaust gas is nitric oxide NO although $NO_2$ can form as the gas cools along the exhaust pipework and when it enters the atmosphere.

A first route is to use a 2-stage system relying upon the plasma oxidation of hydrocarbons (by O, OH radicals) to promote NO to $NO_2$ conversion as a precursor to $NO_2$ reduction over a suitable catalyst. The presence of the hydrocarbons also suppresses further oxidation of the $NO_2$ to acidic species.

This 2-stage process (A) can then be summarised as:

(i) Plasma+NO+hydrocarbons+$O_2$→$NO_2$ 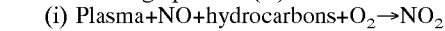

followed by (ii) Catalyst+$NO_2$+hydrocarbons→$N_2$+$CO_2$+$H_2O$ 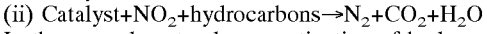

In the second route plasma activation of hydrocarbon in the exhaust promotes $NO_x$ reduction over an NO selective catalyst. This process (B) can be summarised as follows:

(i) Plasma+hydrocarbons+$O_2$→plasma activated hydrocarbons (PAC's) 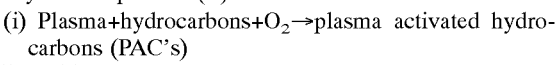

followed by (ii) Catalyst+NO+HC's/PAC's→$N_2$+$CO_2$+$H_2O$ 

This process can occur in a 2 stage or single stage plasma catalyst system. The main effect of the plasma in process B is to activate the hydrocarbon in the exhaust gas that then promotes the reduction of NO over the catalyst as disclosed in WO99/12638. The plasma can activate hydrocarbon that is in the exhaust gas or activate it in a separate stage that serves to inject the activated hydrocarbon into the exhaust gas containing NO before passing over the catalyst combination. This minimises any plasma enhanced NO to $NO_2$ conversion and promotes process B. Process B is especially useful for simultaneous $NO_x$ and particulate removal (Thomas et al SAE 2000-01-1926). For example, when simultaneous removal of $NO_x$ and particulates is required a suitably designed plasma reactor, containing a packing material designed to filter and retain particulate matter, can promote oxidation of the particulates in diesel exhausts at low temperatures. It is suggested that the trapped particulates compete with the hydrocarbons for O and possibly OH radicals. We have recognised that this is an important consideration in plasma catalyst systems employing an $NO_2$ selective catalyst, as the particulate oxidation may deplete the key radicals necessary for NO to $NO_2$ conversion. Thus for simultaneous $NO_x$ and particulate removal, there is advantage in selecting a catalyst formulation which is NO selective (process B).

The present invention is based upon an appreciation of the advantages which flow from the effects of a non thermal plasma when combined in a particular way with a combination or mixture of an NO selective reduction catalyst such as silver alumina and an $NO_2$ selective reduction catalyst such as Indium coated $ZSM_5$ zeolite.

It is an object of the present invention to provide an improved method and reactor system using two or more catalytic materials which respectively provide selective catalytic reduction of NO and $NO_2$ in the emissions of internal combustion engines.

According to the invention there is provided a method for removing oxides of nitrogen from the exhaust emissions from an internal combustion engine comprising the operations of contacting exhaust emissions from an internal combustion engine with a body of silver-containing activated alumina in the presence of a gaseous hydrocarbon material and subsequently contacting the exhaust emissions with a body of indium-containing zeolite material, characterised in that the body of silver-containing alumina is exposed to activated hydrocarbons produced in a non-thermal plasma generated in conditions in which hydrocarbons are activated by the plasma without significant simultaneous production of $NO_2$ by the plasma.

In this way NO reduction over the silver doped alumina catalyst is enhanced and the indium doped zeolite catalyst reduces any $NO_2$ in the exhaust gas or $NO_2$ converted from NO over the first stage silver doped alumina catalyst.

The non-thermal plasma can be arranged to act directly on the exhaust emissions from an internal combustion engine to activate hydrocarbons which are in the exhaust either from unburnt fuel or which have been added to the exhaust. This can be arranged so that the plasma acts upon the exhaust emissions before passing over the catalyst combination, or, alternatively, the catalyst materials can also be exposed to the non-thermal plasma. For either of these approaches, it is important that the conditions are such that the plasma energy is taken up principally for activation of hydrocarbons and not in the production of $NO_2$. This is achieved where other species in the exhaust subjected to the plasma combine thermodynamically more readily with oxygen than NO, as is the case, for example, where the exhaust contains carbonaceous particulates. In this way significant simultaneous production of $NO_2$ by the plasma is avoided.

Alternatively, significant simultaneous production of $NO_2$ by the plasma is avoided by applying the plasma to hydrocarbons separately from the exhaust emissions and injecting plasma activated hydrocarbons into the exhaust emissions.

Types of non-thermal plasma reactor appropriate for this invention include but are not limited to, a dielectric barrier or silent discharge type, a pulsed corona reactor, packed bed reactor such as a ferroelectric bed reactor and a surface discharge reactor.

The concentration of silver in the alumina should be below a percent weight concentration above which $N_2O$ is produced in the catalytic reaction with the effluent stream. This may be achieved by adopting a silver concentration in the range 0.1 to 5 percent by weight. A 2% by weight silver content is a particularly suitable concentration to use. The indium content is in the range 1 to 10 weight percent and a preferred content is approximately 5 weight percent. More than two catalyst combinations can be used to optimise the catalytic $NO_x$ reduction, including exhaust gas containing NO and $NO_2$ over the temperature range required.

Also there may be included the operation of removing carbonaceous combustion products from the exhaust emissions prior to contact with the selective reduction catalysts. This may be done by establishing the non-thermal plasma in the exhaust gas emissions and/or by contacting the exhaust gas emissions with an oxidation catalyst, acting as a carbon combustion catalyst, such as alkali-metal salts including lithium nitrate described in GB 2 232 613 B, cerium oxide, alkali-metal doped lanthanum oxide-vanadium oxide, such as lanthanum-caesium-vanadium pentoxide, alkali metal vanadates and perovskites described in the pending application GB 00 15952.5 filed on the 30th Jun. 2000 or perovskites described in WO 99/38603 or combinations of these materials. In either case attention is required, as explained above, to ensure that the exhaust gas emissions passing over the selective reduction catalysts contain hydrocarbons which have been activated by non-thermal plasma without significant simultaneous production of $NO_2$ by the plasma.

According to the invention in a second aspect there is provided a reactor system for removing nitrogen oxides from exhaust emissions from an internal combustion engine comprising at least one reactor chamber, means for contacting the exhaust emissions with a silver-containing activated alumina material and an indium-containing zeolite material, characterised in that means are provided for exposing the silver-containing alumina to activated hydrocarbons produced in a non-thermal plasma generated in conditions in which hydrocarbons are activated by the plasma without significant simultaneous production of $NO_2$ by the plasma.

The catalytic materials may both or individually be positioned within a plasma region or outside a plasma region and be as mixed coating on a suitable substrate or as separate catalyst sections. A number of permutations may be employed. The catalytic material, can be in the form of spheres, pellets, extrudates, fibres, sheets, wafers, frits, meshes, coils, foams, membrane, ceramic honeycomb monolith or granules or as a coating on any of the above shapes or contained within a dielectric, polymeric or metallic material in any of the above shapes or as a combination of more then one packing. The catalysts may also be coated onto suitable substrate materials such as Fecralloy steel and contained within micro-channel reactors. The amounts of catalysts may be optimised according to the application for example as different percentage volumes, space velocities, metal loadings as required.

Preferably there is included means for measuring the temperature of the exhaust emissions prior to contacting them with the silver-containing alumina, and means for stopping the generation of the non-thermal plasma if the temperature is above a pre-determined value, for example 600 Kelvin.

In one arrangement in accordance with the invention, the silver-containing alumina is in the form of a gas permeable body contained between two electrodes through which the exhaust emissions are constrained to pass, and means is provided for applying to the electrodes across the body of silver-containing alumina a potential sufficient to excite a plasma in the exhaust emissions within the interstices in the body of silver-containing alumina.

In an alternative arrangement, the non-thermal plasma is generated in a plasma generating reactor situated upstream of a reactor chamber containing the silver-containing alumina.

The invention will now be described by way of example, with reference to the accompanying drawings, in which FIG. 1 is a flow diagram of a first embodiment of the invention;

FIG. 2(i) is a series of curves showing the variation with temperature of the concentrations of different nitrogen oxides in the effluent passed over an upstream 80% silver alumina, followed by a 20% indium ZSM5 (by volume) catalyst combination, in which the effluent stream has an initial composition of 500 ppm NO in 10% $O_2$/90% $N_2$ and a C1: $NO_x$ ratio of 6 based on propene ($C_3H_6$). Note that on contacting NO with the $O_2/N_2$ mixture, some $NO_2$ is formed, as indicated by the position of the curves at the 273K temperature axis. (For all plots the values plotted at '273K' represent the input species concentrations and not an effect of the catalysts at this temperature).

FIG. 2(ii) is a series of curves showing the variation with temperature of the concentrations of NO in the effluent from a reactor system embodying the invention of using the plasma and the combination of silver alumina and indium ZSM5 as an 80:20 by volume ratio, in which the effluent stream has an initial composition of 500 ppm NO in 10% $O_2$/90% $N_2$ and a C1: $NO_x$ ratio of 6 based on propene ($C_3H_6$).

FIG. 3 is a series of curves illustrating the effect of differing ratios of hydrocarbon to $NO_x$ in simulated internal combustion engines exhaust gases on the effectiveness of a silver/alumina catalyst as an agent for removing NO from the simulated exhaust emissions with the same initial composition as shown in FIG. 2;

FIG. 4 is a series of curves corresponding to those of FIG. 3 but relating to the effectiveness of indium doped ZSM5 zeolite as an agent for reducing $NO_2$ in the effluent from the silver/alumina catalytic reactor;

FIG. 5 is a flow diagram of a second embodiment of the invention;

FIG. 6 is a flow diagram of a third embodiment of the invention;

FIG. 7 is a flow diagram of a fourth embodiment of the invention;

FIG. 8 shows schematically an exhaust system embodying the invention;

Figure 9:
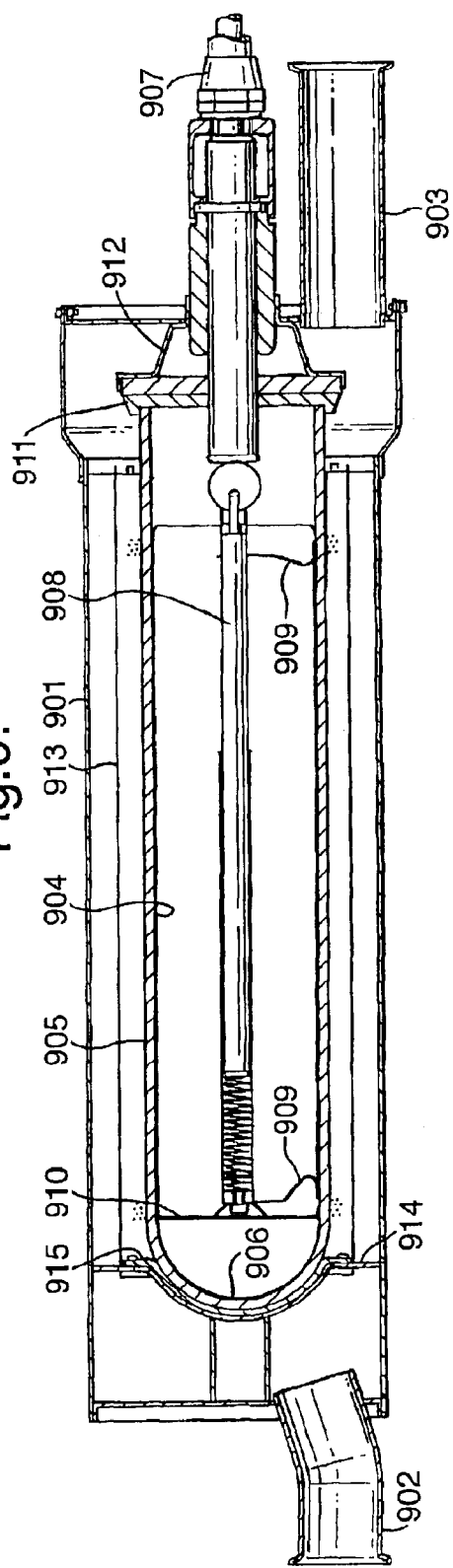
FIG. 9 is a longitudinal section of a plasma generator(of a form described in WO 00/71866) suitable for use in carrying out the invention.

Referring to FIGS. 1 to 4 of the drawings, a method for the removal of $NO_x$ from the exhaust emissions from an internal combustion engine (not shown in the drawing), consists of the operations passing the exhaust gases through a plasma reactor chamber 1 and subsequently flowing these plasma processed exhaust gases through a reactor chamber 2 containing a body of silver-containing activated alumina ($Ag/Al_2O_3$) and passing the effluent from reactor chamber 2 through a reactor chamber 3 containing a body of indium-containing zeolite material (In/ZSM5). The arrows indicate the direction of exhaust gas flow constrained to flow through an appropriate exhaust gas pipe typical of that found, by way of an example, for combustion engines. The catalysts can be contained, as shown, in two separate chambers 2 and 3 or be combined into one chamber. They may be intimately mixed or in separate sections of the single chamber so as to act sequentially.

Providing sufficient hydrocarbons are present in the exhaust gases from the internal combustion engine, such as is the case usually with diesel engines or spark-ignition engines operating in what is known in the art as lean burn conditions, and the temperature of the exhaust gases is in the region of 675° Kelvin, both of which conditions are satisfied in the vicinity of the exhaust manifold of an internal combustion engine, the $Ag—Al_2O_3$ acts to achieve high NO removal from the exhaust gases. Should the temperature of the exhaust gases be greater than approximately 723° Kelvin, however, then some conversion of NO to $NO_2$ may occur.

The In/ZSM5 in the second reactor chamber 3 acts on $NO_2$ in the effluent from the reactor chamber 2 to reduce the $NO_2$ to $N_2$. The In/ZSM5 is effective over a wide range of temperatures, lower than those required by the $Ag/Al_2O_3$ catalyst, about 425° Kelvin being suitable. At higher temperatures there is evidence of back conversion of $NO_2$ to NO. The In/ZSM5 is however more selective at lower $NO_2$ concentrations which results in the $NO_2$ to NO back conversion contribution being very small for the exhaust gas streams where NO is typically the majority $NO_x$ species. This is demonstrated in FIG. 2(i). Also, the reaction of $NO_2$ over the In/ZSM5 catalyst is less dependent on the concentration of hydrocarbons in the gases exposed to it. It is suitable, therefore, for mounting in an exhaust system downstream of the $Ag/Al_2O_3$ catalyst.

FIG. 2(i) presents the temperature-related performance of the silver doped alumina and indium doped zeolite combination of catalysts for removal of NO, $NO_2$ and total $NO_x$ emissions with an initial hydrocarbon:nitrogen oxide ratio in the exhaust gases of 6:1. The catalyst combination demonstrates effective removal of NO, $NO_2$ and total $NO_x$ emissions. What is especially notable is that the presence of the indium catalyst has reduced the $NO_2$ emissions very effectively across a broad temperature range much more effectively than the silver catalyst on its own.

FIG. 2 (ii) presents both the temperature-related performance of the catalyst combination on its own and the effect when, in accordance with the invention, the exhaust gas is subjected to activation by a non-thermal plasma before passing over the silver and indium combination of catalysts. The curves show respective removal of $NO_x$ emissions with an initial hydrocarbon: nitrogen oxide ratio in the exhaust gases of 6:1. The plasma-catalyst combination configuration demonstrates significantly enhanced removal of $NO_x$ emissions over the catalyst only approach.

FIGS. 3 and 4 present curves showing similar parameters for the $Ag/Al_2O_3$ and In/ZSM5 catalysts separately with initial hydrocarbon to $NO_x$ mole ratios of 0, 1:1 and 6:1 based upon a $C_1$ hydrocarbon (number of carbon atoms in hydrocarbon). Note that in the Figures this ratio can refer to hydrocarbon:$NO_x$, hydrocarbon: NO or hydrocarbon: $NO_2$ ratios. In practice a $C_3$ hydrocarbon, propene, was used. To a first approximation propene is equivalent to a three $C_1$ hydrocarbon.

The concentration of silver in the silver/alumina catalyst material may be in the range 0.1 to 5% by weight and the concentration of indium in the indium zeolite catalyst material may be in the range 0.5 to 10% by weight. Preferred values are 2% and 5% respectively. Indium can be deposited onto the zeolite by ion-exchange.

In practice, during the initial start-up of an internal combustion engine or similar for low load/low engine speed conditions, the temperature of the exhaust gases can be typically 425–525 Kelvin and as can be seen from FIG. 3 in particular, at these temperatures the silver/alumina catalyst is relatively inefficient for the reduction of NO, the predominant $NO_x$ component although the In-zeolite is efficient at low temperature for conversion of $NO_2$ to $N_2$. A way of alleviating this problem is to establish a non-thermal plasma in the exhaust gases either before they are exposed to the silver/alumina catalyst, or simultaneously therewith as demonstrated in FIG. 2(ii). Also, it may be necessary to inject additional hydrocarbons into the catalyst reactors and/or plasma, either in the form of the fuel supplied to the engine, or from a separate source to promote the catalytic reduction of $NO_x$. The hydrocarbon, including additional hydrocarbon injected into the plasma, is converted by the plasma into activated hydrocarbon species, as described in WO99/12638. Activated hydrocarbons can include oxygenated hydrocarbons. Such activated hydrocarbons react with nitrogen oxides over catalytic materials such as silver-containing alumina at lower temperatures than hydrocarbons which have not been plasma activated. In this way activated hydrocarbons can extend the temperature range of catalyst activity to lower temperature. For additional hydrocarbon injection a reservoir may be provided for the hydrocarbon additive (derived from the fuel supplied to the engine or from a separate source) and injection of hydrocarbon additive controlled in dependence upon information as to NO concentration in the exhaust. This NO concentration information may be derived from the engine management system and engine map or from an NO sensor appropriately positioned in the exhaust. The plasma can thus introduce beneficial effects, such as enhancing (through the generation of activated hydrocarbons) the action of the silver-indium catalyst combination in reducing $NO_x$ to $N_2$.

FIG. 5 illustrates such a process in which the temperature of the exhaust gases is measured by a sensor 501, which actuates a power source 502 for a plasma. generator 503 when the temperature of the exhaust gases is for example below ~600 Kelvin. It will be appreciated that the appropriate temperature for this control of the plasma may vary according to the exhaust composition and the operating condition of the engine. The plasma is configured in such a way as to activate hydrocarbon in the exhaust gas to promote reduction over the catalysts in reactor chambers 2 and 3.

A more sophisticated process for the treatment of internal combustion engine exhaust emissions may include provision for removing particulate carbonaceous combustion products from the exhaust emissions by passing the exhaust emissions through a soot trap 601 containing, for example, a cordierite wall flow monolith or a silicon carbide filter which may be catalytically coated or a plasma oxidation stage before catalyst reactor chambers 2 and 3. FIG. 6 illustrates such an exhaust emission treatment process. The initial temperature measurement and plasma power supply stages are omitted from the drawing. As an example if soot trap 601 is a plasma oxidation stage it can be operated in such a way as to oxidise the particulate emissions from, for example internal combustion engine exhaust and also activate hydrocarbons in the exhaust gas. These hydrocarbons may be those in the exhaust gas or added to it by systems such as described subsequently in FIGS. 7 and 8. The source of hydrocarbon can also be the soluble organic fraction (SOF) of the particulate. Additional hydrocarbon can also be generated by a controlled post-injection of fuel into the engine. This combined particulate and $NO_x$ removal system can use similar control parameters such as temperature as described with reference to FIG. 5.

FIG. 7 shows schematically a more sophisticated system in which there is incorporated a means for injecting activated hydrocarbons into the exhaust gas further enabling the plasma enhanced catalytic reduction of $NO_x$ to be achieved. Reactor chambers 2 and 3 are as, described previously. A sensor 701 which may monitor for example temperature and/or hydrocarbon concentration provides a signal to a controller 704 which processes the signal and controls the operation of a power source 702 that operates plasma reactor 703. The controller 704 also controls the addition of hydrocarbon from a source 705, which may be stored as a gas, liquid, or solid fuel. This hydrocarbon is injected into the plasma reactor 703, which activates it before injecting it into the main exhaust flow via injection port 706. The exhaust gases containing the plasma-activated hydrocarbons then pass over the catalysts contained in chambers 2 and 3 promoting enhanced $NO_x$ reduction. This approach uses the plasma to activate hydrocarbon via a hydrocarbon injection stage where the plasma does not have the full exhaust flow passing through it. The plasma-activated hydrocarbon is then injected into the main exhaust flow.

FIG. 8 shows schematically another system in which there is incorporated a means for injecting hydrocarbons into the exhaust gas further enabling the plasma enhanced catalytic reduction of $NO_x$ to be achieved. Reactor chambers 2 and 3 are as described previously. Referring to FIG. 8 the temperature of the exhaust gases is measured by a sensor 801, which actuates a power source 802 for a plasma generator 803 positioned upstream of the catalyst chambers 2 and 3, when the temperature of the exhaust gases is for example below ~600 Kelvin. A probe 804 connected to hydrocarbon sensor 805 is also mounted in the exhaust system. The hydrocarbon sensor 805 is connected to a source of hydrocarbon 806. The hydrocarbon source 806 is connected to an injector valve 807 again mounted in the exhaust system upstream of the plasma reactor 803. This hydrocarbon injection stage can then inject additional hydrocarbon to the exhaust gas if it falls below a critical level to sustain $NO_x$ reduction. This stage may be-additionally controlled in conjunction with the plasma stage (not shown in FIG. 8) to match the concentration of additional hydrocarbon added to the appropriate energy density of the plasma to activate sufficient hydrocarbons to promote enhanced $NO_x$ reduction over the catalysts contained in chambers 2 and 3. By way of summary the approach illustrated by FIG. 8 uses a separate hydrocarbon injection stage into the main exhaust flow which then passes through the plasma reactor 803.

It will be appreciated that the arrangements of FIG. 7 and FIG. 8 are readily adapted to respond to measurements from a sensor (not shown) of NO and/or $NO_2$ in the exhaust gases emerging from the final reactor chamber 3.

Figure 10:
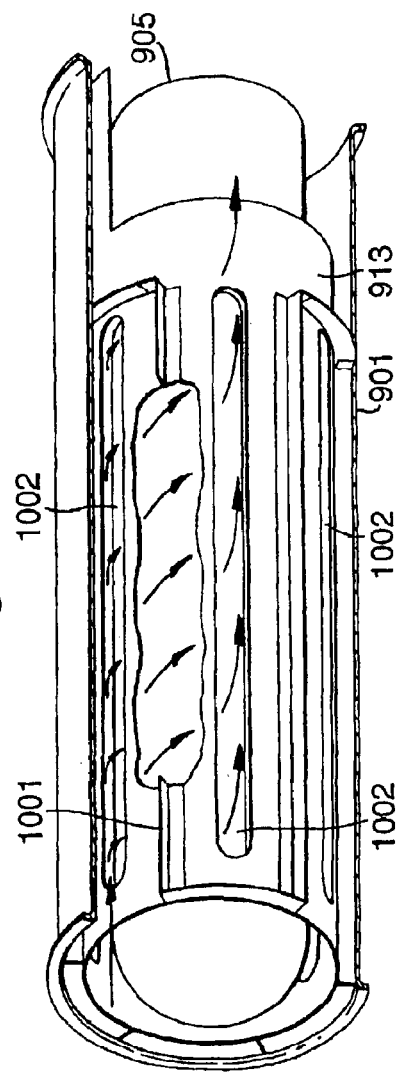
FIG. 10 illustrates the gas flow path through the reactor of FIG. 9.

A suitable plasma generator for use as the plasma generator reactor 801 is shown in FIGS. 9 and 10.

Referring to FIG. 9, the plasma generator reactor 901 consists of a reactor chamber 901 which has inlet and outlet stubs 902, 903 respectively, by means of which it can be incorporated into the exhaust system of an internal combustion engine.

Inside the reactor chamber 901 there is an inner electrode 904 which is supported within a dielectric tube 905, made for example out of α-alumina which has its upstream end closed by a spherical dome 906 to facilitate the flow of exhaust gases through the reactor 901. The inner surface of the dielectric tube 905 can be metallised with a metal coating in order to increase the physical contact between the inner electrode 904 and the dielectric tube 905. In this example, the inner electrode 904 is conveniently provided by a deposited electrically conducting layer of silver on the inner surface of the dielectric tube 905. High voltage connection via an high voltage input terminal 907 is made through a spring loaded telescopic tube assembly 908 and spring contacts 909. Load from the sprung telescopic tube assembly 908 is received by a load spreader plate 910, which is connected to the conducting layer of silver forming the inner electrode 904. The materials, including the spring are required to operate at elevated temperatures, and the spring must have low creep at such temperatures. A preferred material for the spring is an Inconel alloy such as that known as X750. An alumina end flange 911 is shaped to receive and locate the end of the dielectric tube 905 and is itself located by a sprung metal clip 912.

A convenient potential for the excitation of the plasma is of the order of kilovolts to tens of kilovolts and repetition frequencies in the range 50 to 5000 Hz, although higher frequencies of the order of tens of kilohertz can be used. Pulsed direct current is convenient for automotive use, but alternating potentials for example triangular or sine waves of the same or similar characteristics can be used. The potential is, when required, applied to the inner electrode 904 through the high voltage input terminal 907. Concentric with the inner electrode 904 and dielectric tube 905 is a grounded outer electrode 913 made for example of stainless steel.

At the inlet end of the plasma generator reactor 801 the spherical dome of the dielectric tube 905 is in contact with a compliant heat resistant material 914 that rests in the curved part of the outer electrode 913 and is held in place by a metallic ring 915 with a series of screws (not shown).

As shown in FIG. 10, the outer electrode 913 has a series of baffles 1001 and slots 1002. The baffles 1001 extend from the outer electrode 913 to the inner surface of the wall of the reactor chamber 801 and act as grounding connections as well as causing the exhaust gases to follow a convoluted path which has both axial and circumferential components and being at least partially helical. There is also a radial component of flow, initially inwardly as the gas transfers from the outside of the outer electrode 913 to the space between the electrodes 904 and 913 and then outwardly as the gas returns, to leave the reactor from outside the outer electrode 913. Thus there is also a spiral component in the gas flow pattern.

Where the reactor is to be used for a configuration in which the plasma is generated within the intertices of a porous body of the silver doped alumina catalyst, the latter is disposed in the space between the electrodes 904 and 913.

It will be appreciated by those skilled in the art that other configurations including axial flow such as a parallel plate configurations can be adopted if desired as can other forms of non-thermal plasma generator such as pulsed corona discharge reactors, surface discharge reactor, dielectric and/ or ferroelectric pellet bed reactor. The invention may also be incorporated into other aftertreatment systems, engine modifications or emissions control technologies such as EGR, cooled EGR, soot traps, continuously regenerating traps.

What is claimed is:

1. A method for removing oxides of nitrogen from the exhaust emissions from an internal combustion engine, comprising the operations of contacting exhaust emissions from an internal combustion engine with a body of silver-containing activated alumina in the presence of a gaseous hydrocarbon material and subsequently contacting the exhaust emission with a body of indium-containing zeolite material, characterised in that the body or silver-containing alumina is exposed to activated hydrocarbons produced in a non-thermal plasma generated in conditions in which hydrocarbons are activated by the plasma without significant simultaneous production of $NO_2$ by the plasma.

2. A method according to claim 1, further characterised in that significant simultaneous production of $NO_2$ by the plasma is avoided by applying the plasma to the exhaust gases under conditions in which carbonaceous combustion products are present.

3. A method according to claim 1, further characterised in that significant simultaneous production on of $NO_2$ by the plasma is avoided by applying the plasma to hydrocarbons separately from the exhaust emissions and injecting plasma activated hydrocarbons into the exhaust emissions.

4. A method according to claim 1, further characterised in that there is included the operations of measuring the temperature of the exhaust emissions prior to contacting them with the silver-containing alumina and stopping the generation of non-thermal plasma when the temperature of the exhaust emissions is above a predetermined value.

5. A method according to claim 4, further characterised in that generation of non-thermal plasma is stopped when the temperature of the exhaust emission is above 600° Kelvin.

6. A method according to claim 1, further characterised in that there is included the operations of determining the initial concentration of hydrocarbons in the exhaust emissions and controlling addition of hydrocarbons to promote reduction of nitric oxide over the silver-containing alumina and reduction of nitrogen dioxide over the indium-containing zeolite material.

7. A method according to claim 1, further characterised in that there is included the operation of removing carbonaceous combustion products from the exhaust emissions prior to contacting them with the silver-containing alumina material.

8. A method according to claim 7, further characterised in that removal of carbonaceous combustion products is facilitated by passing the exhaust emissions over an oxidation catalyst acting as a carbon combustion catalyst.

9. A method according to claim 8, further characterised in that the oxidation catalyst is an alkali metal salt, cerium oxide, an alkali metal vanadate, a perovskite or alkali metal doped lanthanum oxide-vanadium oxide or combinations of these.

10. A method according to claim 1, further characterised in that the concentration of silver in the alumina is in the range 0.1 to 5 percent by weight.

11. A method according to claim 10, further characterised in that the concentration of silver in the alumina is approximately 2 percent by weight.

12. A method according to claim 1, further characterised in that the concentration of indium in the zeolite material is in the range 1 to 10 percent by weight.

13. A method according to claim 12, further characterised in that the concentration of indium in the zeolite material is approximately five percent by weight.

14. A method according to claim 13, further characterised in that the zeolite is a ZSM5 with a silica to alumina mole ratio around fifty to one.

15. A reactor system for removing nitroqen oxides from exhaust emissions from an internal combustion engine comprising at least one reactor chamber and a non-thermal plasma reactor, means for contacting the exhaust emissions from an internal combustion engine with a silver-containing activated alumina material and an indium-containing zeolite material, and means for exposing the silver-containing alumina to activated hydrocarbons produced in said non-thermal plasma reactor and generated in conditions in which hydrocarbons are activated by the plasma without significant simultaneous production of $NO_2$ by the plasma.

16. A reactor system according to claim 15, further characterised in that there is included means for measuring the temperature of the exhaust emissions prior to contacting them with the silver-containing alumina, and means for stopping the generation of non-thermal plasma if the temperature of the exhaust emissions is above a predetermined value.

17. A reactor system according to claim 15, further characterised in that said at least one reactor chamber comprises a first reactor chamber containing the silver-containing alumina, and a second reactor chamber containing the indium-containing zeolite material.

18. A reactor system according to claim 17, further characterized in that the silver-containing alumina is in the form of a gas permeable body contained between two electrodes through which the exhaust emissions are constrained to pass, and means for applying to the electrodes across the body of said silver-containing alumina a potential difference for exciting a plasma in the exhaust emissions within the interstices in the body of silver-containing alumina.

19. A reactor system according to claim 15, further characterised in that, to avoid significant simultaneous production of $NO_2$ by the plasma, hydrocarbon is fed into a plasma reactor from a supply reservoir separate from the exhaust emissions and the plasma activated hydrocarbons injected into the exhaust emissions prior to contacting the silver-containing activated alumina material and indium-containing zeolite material in the reactor chamber or chambers.

20. A reactor system according to claim 19, further characterised in that indicator means provide an indication of NO concentration in the exhaust emissions and there is provided means controlled in dependence upon the said indication of NO concentration for extracting hydrocarbon additive from the supply reservoir and injecting it into the exhaust emissions prior to them entering the said at least one reactor chamber.

21. A reactor system according to claim 20, further characterised in that the said means for extracting and injecting hydrocarbon additive is controlled to provide just sufficient hydrocarbon additive to minimise $NO_x$ concentration in the exhaust emissions.

22. A reactor system according to claim 15, further characterised in that there is included means for removing carbonaceous combustion products from the exhaust emissions prior to contacting them with the silver-containing alumina material.

23. A reactor system according to claim 15, further characterised in that the concentration of silver in the silver-containing alumina is in the range 0.1 to 5 percent by weight.

24. A reactor system according to claim 23, further characterised in that the concentration of silver in the silver-containing alumina is approximately 2 percent by weight.

25. A reactor system according to claim 15, further characterised in that the concentration of indium in the indium-containing zeolite material is in the range 1 to 10 percent by weight.

26. A reactor system according to claim 25, further characterised in that the concentration of indium in the indium-containing zeolite is approximately 5 percent by weight.

* * * * *